United States Patent [19]

Chin

[11] Patent Number: 4,544,944
[45] Date of Patent: Oct. 1, 1985

[54] AUTO-TINT CIRCUIT FOR A TV RECEIVER
[75] Inventor: Danny Chin, Plainsboro, N.J.
[73] Assignee: RCA Corporation, Princeton, N.J.
[21] Appl. No.: 501,896
[22] Filed: Jun. 7, 1983
[51] Int. Cl.$^4$ ............................ H04N 9/535; H04N 9/32
[52] U.S. Cl. ......................................... 358/28; 358/13
[58] Field of Search ..................... 358/28, 13; 364/731

[56] References Cited

U.S. PATENT DOCUMENTS

| | | | |
|---|---|---|---|
| 3,536,827 | 11/1967 | Bell | 178/5.4 |
| 3,617,621 | 11/1971 | Cochran | 178/5.4 |
| 3,649,748 | 5/1972 | Knauer | 178/5.4 |
| 3,663,744 | 5/1972 | Harwood | 178/5.4 |
| 3,852,807 | 12/1974 | Caprio et al. | 358/28 |
| 3,873,760 | 4/1975 | Worden | 358/21 |
| 3,952,187 | 4/1976 | Robinson et al. | 364/731 |
| 3,996,608 | 12/1976 | Harwood | 358/28 |
| 4,001,879 | 1/1977 | Nagaoka et al. | 358/28 |
| 4,084,178 | 4/1978 | Srivastava et al. | 358/28 |
| 4,434,437 | 2/1984 | Strolle et al. | 364/731 X |
| 4,500,972 | 2/1985 | Kuhn et al. | 364/731 X |
| 4,503,453 | 3/1985 | Rougeolle et al. | 358/13 |

FOREIGN PATENT DOCUMENTS 0071506  7/1982  European Pat. Off. .

OTHER PUBLICATIONS

Harwood et al., "Chroma Circuit Design for the CTC-49", RCA Engineer, vol. 15, No. 5, Feb./Mar. 1971, pp. 15–19.
"Digivision", Development Data, Aug. 1982, ITT Intermetall Semiconductors, Freiburg, Germany.
ITT Auto Flesh Processing Circuit.

Primary Examiner—Michael A. Masinick
Assistant Examiner—Michael P. Dunnam
Attorney, Agent, or Firm—E. M. Whitacre; P. J. Rasmussen; E. P. Herrmann

[57] ABSTRACT

An auto-flesh circuit for a TV receiver is described which operates an I and Q color mixture signals to produce flesh corrected color mixture signals I' and Q'. The received I and Q signals are demodulated in respective circuitry to generate the magnitude and angle of their vector sum. The angle values are applied as address codes to a ROM programmed to produce the sines and cosines of the applied address codes. For address code angles corresponding to chrominance signals representing flesh tones, the values of the programmed sines and cosines correspond to values of flesh corrected chrominance angles. The sine and cosine values output by the ROM are then multiplied by the magnitude of the vector sum (chrominance magnitude) to produce corrected Q' and I' color mixture signals respectively.

10 Claims, 7 Drawing Figures

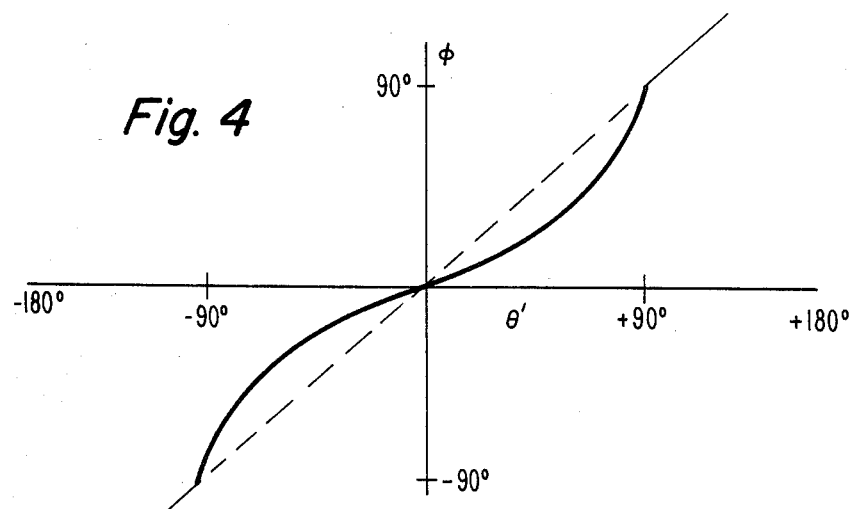
Fig. 4
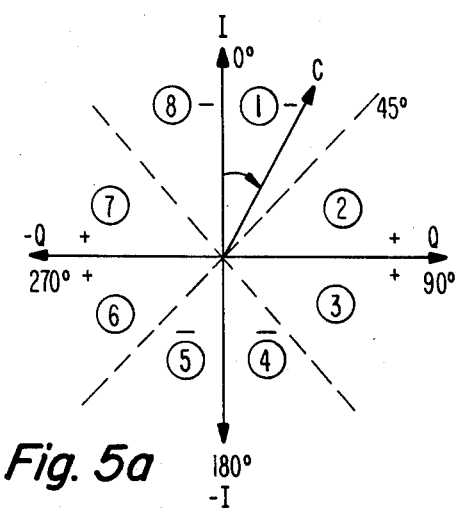
Fig. 5a
| SECTOR | VALUE ADDED | A/S | SIGN BITS Q | SIGN BITS I | LOG Q/I |
|---|---|---|---|---|---|
| 1 | 0 | A | 0 | 0 | 1 |
| 2 | 90 | S | 0 | 0 | 0 |
| 3 | 90 | A | 0 | 1 | 0 |
| 4 | 180 | S | 0 | 1 | 1 |
| 5 | 180 | A | 1 | 1 | 1 |
| 6 | 270 | S | 1 | 1 | 0 |
| 7 | 270 | A | 1 | 0 | 0 |
| 8 | 360 | S | 1 | 0 | 1 |
Fig. 5b
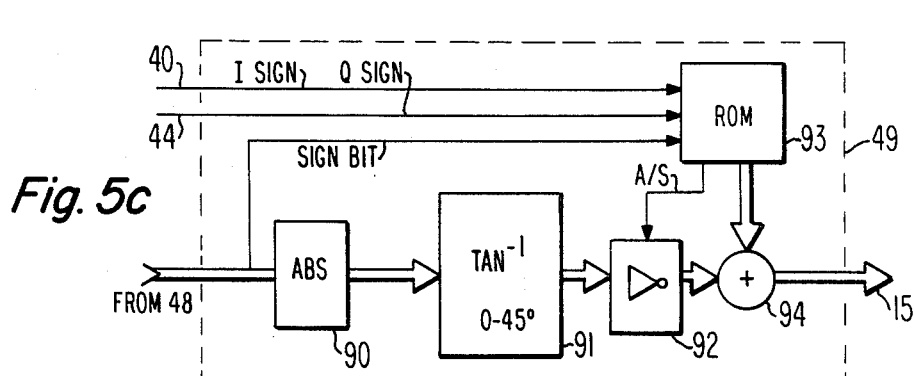
Fig. 5c

AUTO-TINT CIRCUIT FOR A TV RECEIVER

BACKGROUND OF THE INVENTION

This invention relates to auto-tint circuits and more particularly to circuitry in a digital TV receiver for correcting color falling in the range associated with flesh tones.

Heretofore auto-tint or auto flesh circuits have generally included circuitry to detect when the angle of the chrominance signal represents flesh tones and to generate a control signal to adjust the color toward more true flesh tones. For example the auto-flesh circuit described in U.S. Pat. No. 3,996,608 (Harwood) employs such a control signal to alter the phase of the reference signal applied to the color demodulation circuitry to rotate the phase of the color mixture signals. In the auto-flesh circuit described in U.S. Pat. No. 3,852,807 (Caprio, et al.) the control signal generated by the chrominance phase detection circuit is used to completely disable the Q color mixture signal thereby forcing the chrominance signal to fall on the I color mixture signal axis.

SUMMARY OF THE INVENTION

The present invention, particularly applicable to TV receivers incorporating digital processing circuitry, performs auto-flesh correction without the need for circuitry to detect when the chrominance angle has entered the flesh tone range. The present invention operates on color mixture signals to produce adjusted color mixture signals without adversely affecting the saturation level when the chrominance signal is within the range of colors associated with flesh tones. The received color mixture signals are demodulated to produce the instantaneous magnitude and angle of chrominance signal. The signal corresponding to the demodulated angles is applied to the address input of a ROM programmed to produce the sines and cosines of the applied angles. For angles corresponding to flesh tones the ROM is programmed to produce sines and cosines of color corrected angles. The sine and cosine values from the ROM are multiplied by the demodulated chrominance magnitude to generate flesh corrected color mixture signals.

BRIEF DESCRIPTION OF THE DRAWINGS

FIG. 4 is a graphical illustration showing one function by which the argument of the sines and cosines in the ROM may be programmed to effect auto-flesh control; and FIGS. 5a, b and c describe a parts count reduced arctangent ROM lookup table.

DETAILED DESCRIPTION

The invention will be described with reference to I and Q color mixture signals but it should be recognized that it is applicable to other quadrature related color mixture signals with appropriate programming of the aforementioned ROM which provides the sines and cosines of the chrominance angle. The I and Q signals were chosen because they tend to be preferred signals for processing in NTSC receivers, by reason of their producing higher fidelity color signals to the display kinescope.

The I color mixture signal axis is close to the axis associated with normal flesh tones. For simplicity of circuit design it has been found convenient to treat the I axis as the flesh tones axis when performing flesh tone correction. Thus when the chrominance signal, C, is corrected to exhibit more nearly "true" flesh tone color in a system processing I and Q signals, the chrominance vector is rotated toward the I axis.

Figure 1:
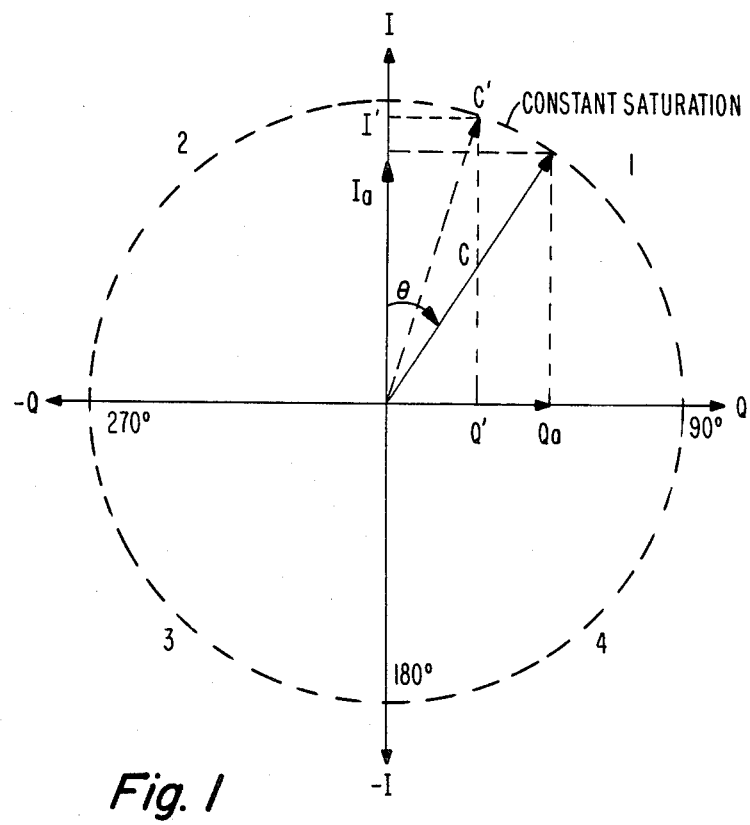
FIG. 1 is a vector diagram showing the relationship of I and Q color mixture signals to the chrominance vector.

Referring now to FIG. 1, the I and Q signal axes are shown normal (in quadrature) to each other. The chrominance signal, C, is represented as the vector sum of the instantaneous I color mixture signal Ia and the instantaneous Q color mixture signal Qa. Conversely the instantaneous signals Ia and Qa can be represented by the equations:

$$Ia = C \cos \theta \quad (1)$$

$$Qa = C \sin \theta \quad (2)$$

where C is the magnitude of the chrominance vector. Assume that for a given range of angles $\theta$ in quadrants 1 and 2 that the chrominance signal represents colors which tend to approach flesh color. For instance if the vector C is twenty degrees from the I axis the reproduced color will appear to be flesh color with a magenta tint. On the other hand if the vector is three hundred forty degrees from the I axis it will tend toward flesh color with a yellowish tint.

If the tinted flesh colors occur in the reproduced flesh areas of a person they tend to be particularly objectionable. The offending tint can be automatically reduced by rotating the instantaneous chrominance vector toward the I axis whenever the angle of the chrominance signal is within the range of angles associated with normal flesh tones. Such automatic flesh tone correction will tend to distort the colors of objects (other than people) having colors falling in the flesh tone range, however, it has been found less objectionable to view the purposely distorted colors of such objects created by auto-flesh correction than it is to view the image of a person with uncorrected flesh colors.

In order to rotate the chrominance signal toward the I axis (i.e. correct for flesh tones) it is convenient to adjust the signals representing its component parts, i.e. signals Ia and Qa, and complete the color signal processing with corrected color mixture signals Ia' and Qa'.

If the magnitude C and angle $\theta$ of the chrominance signal are known, corrected chrominance signal components Ia' and Qa' can be generated by multiplying the magnitude C by the sines and cosines of a rotated angle $\theta'$ so that:

$$Ia' = C \cos \theta' \quad (3)$$

$$Qa' = C \sin \theta'. \quad (4)$$

For flesh-tone correction the chrominance angle is normally rotated only in the range of angles $\theta$ equal to $\pm 90°$. In addition the amount of angle rotation should be greatest for chrominance angles around $\pm 45$ degrees and the correction should tend toward zero near the I axis (i.e. for $\theta = 0$) and for angles $\theta$ approaching $\pm 90$ degrees. FIG. 4 graphically describes an illustrative function of the arguments for the sines and cosines versus angle $\theta$ to effect auto-flesh correction. The curve describes the function of the sine, cosine argument $\phi$ given by:

$$\phi = \theta \text{ for } 90° \leq \theta \leq 270° \quad (5)$$

$$\phi = \theta - K \sin \theta \text{ for } 0° < \theta < 90° \text{ and } 270° < \theta < 360° \quad (6)$$

The argument $\phi$ may however be realized by any function deemed appropriate to produce desirable tint correction.

Figure 2:
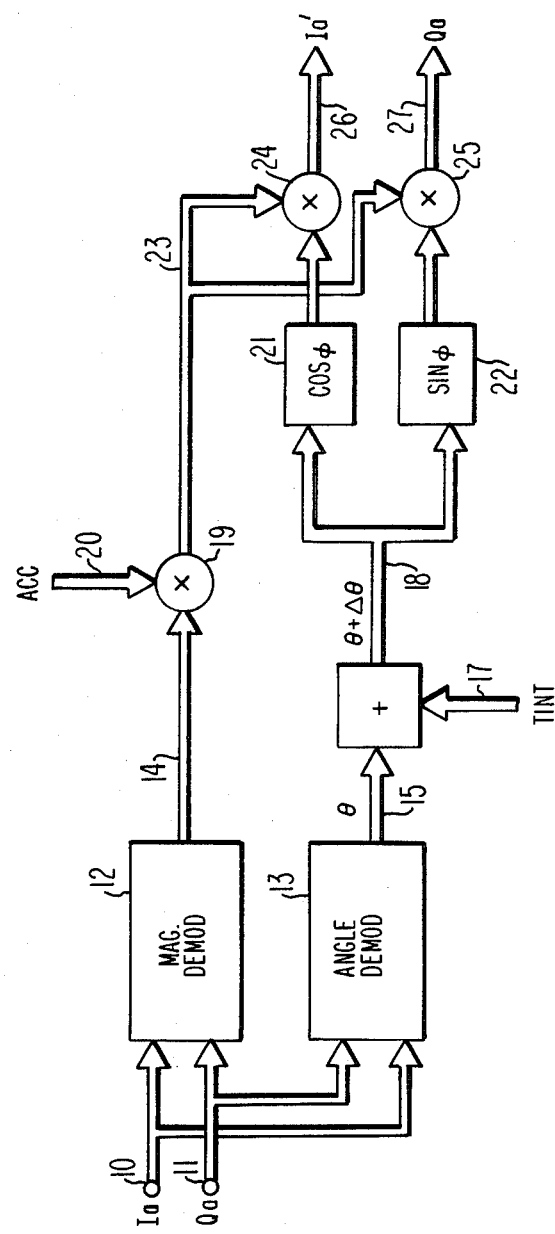
FIG. 2 is a block diagram of auto-tint circuitry embodying the present invention.

FIG. 2 exemplifies circuitry for performing the abovedescribed auto-flesh correction without the necessity of detecting when the chrominance signal instantaneously corresponds to flesh color. The circuitry is located in the color signal processing path of a TV receiver after separation from the composite video signal. The presumption is made that the signal is in digital format (e.g. 8-bit parallel PCM signal) though the concepts are applicable to analog signal processing and that the chrominance signal has been demodulated into I and Q quadrature color mixture signal components.

The I and Q signals are applied respectively to terminals 10 and 11 from which they are both routed to a magnitude demodulator 12 and an angle demodulator 13. The magnitude demodulator generates a signal C representing the magnitude of the vector sum of the I and Q signals, i.e. $C = \sqrt{I^2 + Q^2}$ and produces this value on connection 14. The angle demodulator produces a signal on connection 15 corresponding to the angle $\theta$ between the chrominance vector and the I axis, i.e. $\theta = \tan^{-1}(Q/I)$.

The magnitude signal, C, is applied to multiplier circuit 19, wherein it is amplified or attenuated by a gain control signal, ACC, generated by furher circuitry not shown. (Note the gain control circuit 19 is optional to the remainder of the circuitry.) The amplified chrominance magnitude signal C' produced on bus 23 is applied to further multiplier circuits 24 and 25.

The signal corresponding to angle $\theta$ is applied to an ADDER circuit 16 wherein a signal $\Delta\theta$ is added or subtracted from the angle $\theta$ to effect static tint control. The signal $\Delta\theta$ is applied as a second input to ADDER 16 via connection 17 under viewer control while he is observing the reproduced image, to adjust the overall color rendition to his liking. (This static tint control is also optional.) The augmented angle signal $\theta' = \theta \pm \Delta\theta$ is applied as address codes to circuit elements 21 and 22 which respectively produce the sine and cosine of arguments corresponding to address codes applied to their inputs. Elements 21 and 22 may be read only memories (ROM's). To perform auto-flesh correction the ROM's are programmed to produce sine and cosine values according to, for example, the arguments $\phi$ represented in FIG. 4 for the applied addresses $\theta'$. The signals corresponding to sin $\phi$ from element 22 are applied to a second input of multiplier 25 which generates a corrected color mixture signal Qa' at output port 27 according to equation (4). Signals corresponding to cos $\phi$ from element 21 are applied to a second input port of multiplier 24 which produces corrected color mixture signals Ia' at output port 26 according to equation (3). The corrected signals Ia' and Qa' signals are thereafter applied to further circuitry, i.e. an RGB matrix (not shown) for further processing.

The flesh correction is programmed into the ROM's 21 and 22, which respond automatically to a chrominance angle in the flesh tone range to correct the chrominance angle, thereby obviating circuitry for detecting when the chrominance signal represents colors in the nominal flesh color range.

Figure 3:
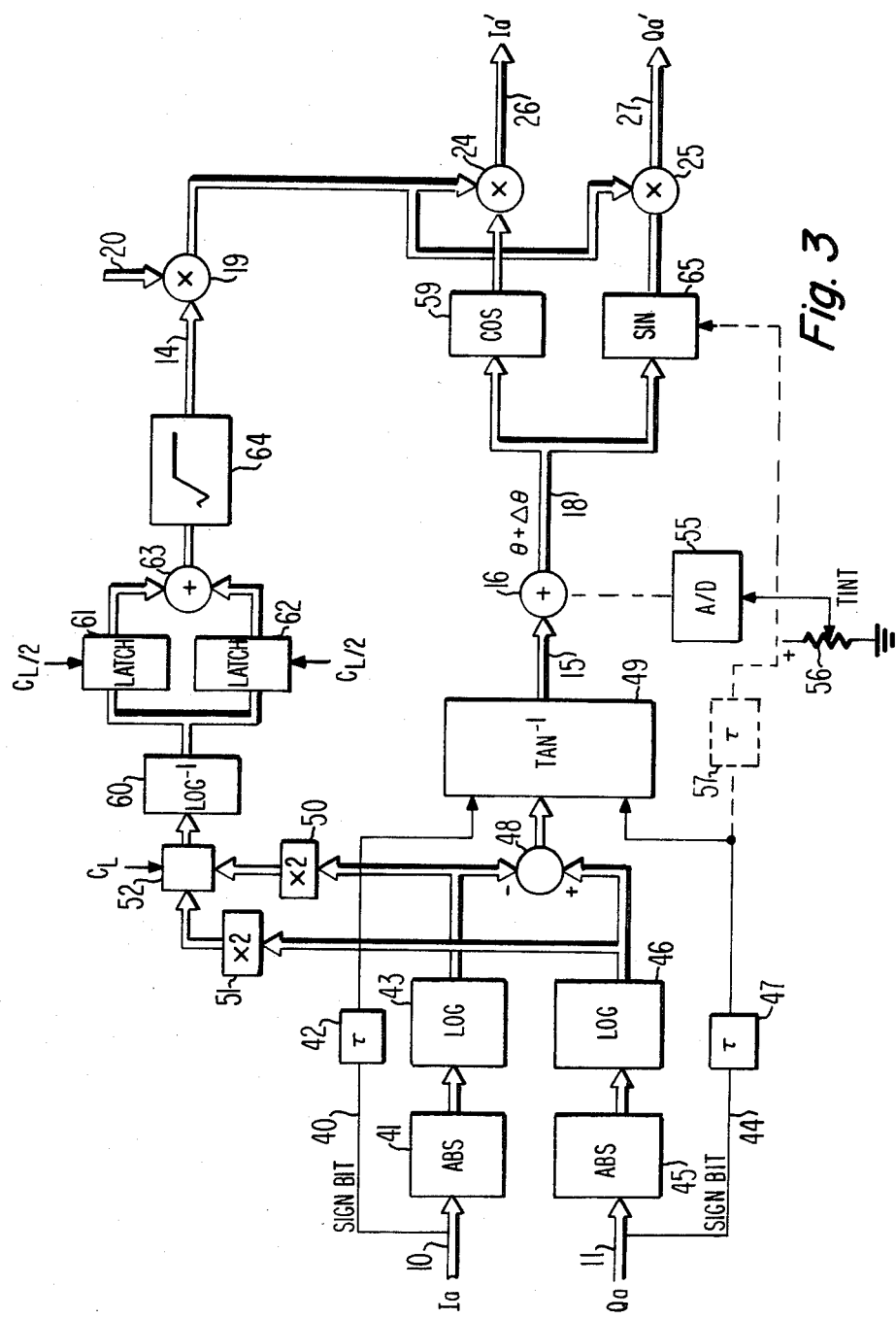
FIG. 3 is a block diagram of illustrative circuitry for realizing the FIG. 2 circuit.

FIG. 3 illustrates in greater detail a circuit which performs the function of the FIG. 2 circuitry. Elements in FIG. 3 designated with the same numerals as elements in FIG. 2 are similar or perform like functions.

In the figure the Ia and Qa signals available at terminals 10 and 11 are respectively applied to absolute value circuits 41 and 45 which pass the instantaneous magnitudes of the Ia and Qa signals. These magnitudes $|Ia|$ and $|Qa|$ are respectively applied as address codes to ROM's 43 and 46 which are programmed to produce the logarithms of the applied address codes. The log $|Ia|$ from ROM 43 is subtracted from the log $|Qa|$ in circuit 48 (e.g., a binary subtraction circuit) to produce signal samples corresponding to log $(|Qa|/|Ia|)$ at its output port. The values of log $(|Qa|/|Ia|)$ from element 48 are applied as address codes to a ROM 49. The sign bits of signals Ia and Qa available on connections 40 and 44 are added to the log $|Qa|/|Ia|$ address codes in the two most significant bit positions to form a composite address code. ROM 49 is programmed to produce antilogs associated with its address codes which antilogs correspond to the arctangent of Qa/Ia (equal to the angle $\theta$).

Assume that the N least significant bits of the ROM 49 address input are coupled to circuit 48, the N+1$^{st}$ bit is coupled to the Ia sign bit and the N+2$^{nd}$ bit is coupled to the Qa sign bit. Assume also that the sign bits are 0's for positive values and 1's for negative values so that the Ia sign bit is "0" for Ia signal values occurring in quadrants 1 and 2 and "1" for Ia signal values occurring in quadrants 3 and 4. The Qa sign bit is "0" in quadrants 1 and 4 and "1" in quadrants 2 and 3. ROM 49 is programmed to output the arctangent of the antilog of the N least significant bits of the applied address code for the N+1$^{st}$, and N+2$^{nd}$ address bits both being equal to "0". For the N+1$^{st}$ and N+2$^{nd}$ address bits being respectively 01, 11 and 10, corresponding to quadrants 4, 3 and 2, ROM 49 is programmed to output signals corresponding to 180° minus; 180° plus; or 360° minus the arctangent of the antilog of the N least significant bits of the address code. In this manner, ROM 49 produces angles over the range of 0–360 degrees.

Note delay elements 42 and 47 are included in the sign bit connections 40 and 44 to compensate for the delay incurred by the Ia and Qa magnitudes coursing through elements 41,43 and 45,46 plus element 48.

The problem of determining negative logarithms is eliminated by processing only the magnitudes of Ia and Qa and accounting for the sign by applying the respective sign bits as part of the address code to the antilog ROM 49.

The signals corresponding to log $|Ia|$ and log $|Qa|$ are respectively also applied to times two multipliers 50 and 51 to generate the signals log $|Ia|^2$ and log $|Qa|^2$ which are thereafter multiplexed by circuit 52 as address codes to ROM 60. ROM 60 is programmed to sequentially generate the antilogs corresponding to signals Ia$^2$ and Qa$^2$ which are thereafter demultiplexed by latches 61 and 62 respectively. The signals Ia$^2$ and Qa$^2$ are applied to ADDER circuit 63 which produces the sum Ia$^2$+Qa$^2$. This sum is applied to circuit 64 which generates the square root of such sums. The signal from circuit 64 corresponds to the magnitude of the chrominance vector.

The magnitude signal, C from circuit 64 is applied to the gain control multiplier 19 wherein it is amplified and then applied to multipliers 24 and 25. The amplified magnitude signal is therein multiplied with the sines and cosines of the flesh corrected chrominance angles to generate flesh corrected signals Ia' and Qa' as in FIG. 2.

The static tint control signal $\Delta\theta$ is produced by the user adjusting potentiometer 56. The potential generated at the output of the potentiometer is applied as an input signal to the analog-to-digital converter 55 which conditions the analog potential for application to ADDER 16 in PCM format.

In FIG. 3 there is a phantom connection shown between the Qa sign bit and the sine generator 65. This connection expedites reduction of the required memory capacity of the ROM 65 and ROM 59. With reference to FIGS. 1 and 4 it will be seen that the cosine function for angles from 0 to 180 degrees (quadrants 1 and 4) is equal to the cosine function for angles from 360 to 180 degrees (quadrants 2 and 3). The angles from 180 to 360 degrees can therefore be represented by (360-$\theta$) degrees i.e. angles from 180 to 0 degrees. Thus the cosine ROM (59) need only be programmed for angles from 0 to 180 degrees. The sine function from 180 to 360 degrees (quadrants 3 and 2) will be seen to equal the negative of the sine function from 180 to 0 degrees (quadrants 4 and 1). Thus the sine ROM (65) also need only be programmed with values from 0 to 180 degrees if there is provision for complementing (changing polarity) the sine values for angles (360-$\theta$) degrees. ROM 65 is presumed to include a complementing circuit in series with its output connection, which circuit complements the output values responsive to the Qa signal sign bit i.e. when Qa is negative (in quadrants 2 and 3 of FIG. 1).

Since the sine and cosine tables may be programmed to respond only to angles from 0 to 180 degrees the antilog table (ROM) 49 must be programmed to provide only those angles. Remembering that the values of address codes applied to ROM 49 from element 48 represent only the angles from 0 to 90 degrees by virtue of processing the absolute values of Ia and Qa, incremental angles from 90 to 360 degrees are determined by the Ia and Qa sign bits added to form the composite address code. To effect production of angles 0 to 180 degrees and 360-$\theta$ from 180 to 360 degrees, the Qa sign bit may simply be omitted from the ROM 49 address code. When the system is realized in this manner the size of the antilog ROM 49 may also be halved relative to an antilog ROM programmed to produce angles over the full range of angles from zero to 360 degrees.

Another alternative auto-flesh circuit may be realized in the FIG. 3 configuration wherein the auto-flesh angle function (for example the one described by FIG. 4) is programmed directly into the arctangent values produced by ROM 49 responsive to the address codes log (|Qa|/|Ia|) and Ia and Qa sign bits. In this instance the ROM's 59 and 65 would be programmed to provide the cosines and sines of the angles applied thereto as input signal addresses.

FIG. 5 illustrates a circuit arrangement for minimizing the required memory size of the FIG. 3 element 49 (when programmed to linearly produce arctangent values).

In FIG. 5c the arctangent ROM 91 is required to contain programmed angles only from zero to 45 degrees. Consider the values log (|Qa|/|Ia|) equal to log |Qa|-log |Ia| that are available from subtractor circuit 48. For angles $\theta$ between zero degrees and 45 degrees signal component Ia are greater than Qa thus rendering the difference negative. At 45 degrees Ia=Qa and the difference is zero and between 45 and 90 degrees the difference is positive. The magnitude of the difference is symmetric about the 45 degree angle. Thus if the absolute value of the difference log |Qa|-log |Ia| is applied to the arctangent ROM only angles between zero and 45 degrees can be addressed and thus only the angles 0-45 degrees need be programmed in the table 91. In FIG. 5c the log differences from element 48 are applied to circuit element 90 which applies the magnitude of the differences as address codes to the arctangent ROM 91. The sign bit information of the difference and the Ia and Qa signals is used to appropriately translate the zero to 45 degree angles produced by ROM 91 into the appropriate angles 0-360 degrees (or zero to ±180 degrees).

FIG. 5a shows the I and Q coordinate system divided into eight 45 degree sectors numbered one to eight. The polarity of log |Qa|-log |Ia| is indicated for each sector. For sector 1 assume that the ROM 91 is programmed to provide the angles zero to 45 degrees for the appropriate address code |log|Qa|-log |Ia||. In sector 2 however as the vector C proceeds from the 45 degree angle towards the 90 degree angle, ROM 91 produces angles from 45 degrees downwards towards zero. The correct values may, however, be provided at output connection 15 by subtracting the angles produced by ROM 91 from 90 degrees. Similarly in sectors three thru eight the correct angles are generated by adding or subtracting the output of ROM 91 from the appropriate values of 90, 180, 270 or 360 degrees.

The angles from which the ROM 91 angles are added or subtracted are stored in a further ROM 93. ROM 93 provides the requisite angular value in response to the Ia, Qa and difference value sign bits which are applied as address codes. The angle values from ROM 93 are algebraically combined with the angles from ROM 91 in the adder 94. The angles from ROM 91, are complemented for those sectors which require a subtraction of such angles from those provided from ROM 93. The element 92 controlled by the A/S control line from ROM 93 selectively two's complements (changes polarity) the values corresponding to the angles from ROM 91 when the chrominance vector is in the particular sectors.

FIG. 5b is a table illustrating the states of the sign bits of signals I, Q and log (|Q|/|I|) for each sector, the angle value provided from ROM 93, and whether the value from ROM 91 is to be added (A) to or subtracted (S) from the value from ROM 93. The sign bits are presumed to be in two's complement form i.e. a logic 1 for a negative value and a logic zero for positive value. Note the combination of the three sign bits form a unique code for each sector.

For clarification of the claims, the term "ratios" of first and second signals is meant to include at least the arithmetic ratios of the two signals or the logarithms of such ratios. The term "trigonometric ratios" is meant to include one or more of the standard trigonometric functions including sine, cosine, secant, cosecant, tangent or cotangent.

What is claimed is:

1. In a TV receiver including a source of first and second quadrature related color mixture signals, means for automatically altering the color represented by such first and second signals when they correspond to a prescribed range of colors comprising:

first detection means responsive to said first and second signals for producing the magnitude of the vector sum thereof;

second detection means responsive to said first and second signals for producing a signal corresponding to the instantaneous angle of said vector sum;

means responsive to said angle signal for generating the sines and cosines thereof and for angles in said prescribed range of colors generating the sines and cosines of adjusted angles; and means for multiplying said sines and cosines by said magnitude to produce first and second altered quadrature related color mixture signal.

2. An auto-tint circuit in a color TV receiver, having a source of quadrature related color mixture signals I and Q, for generating corrected quadrature related signals I' and Q', comprising:

means responsive to the I and Q signals for generating a signal corresponding to the magnitude of the vector sum of the I and Q signals;

means responsive to the I and Q signals for generating a signal corresponding to the angle $\theta$ between the vector sum of the I and Q signals and the axis of one of the I and Q signals;

means responsive to the signal corresponding to said angle $\theta$ for generating signals corresponding to the cosines and sines of an angle $\phi$ where $\phi$ is a function of $\theta$ for the angle $\theta$ occurring in a prescribed range of angles, and $\phi$ equals $\theta$ otherwise;

means responsive to the signal corresponding to said magnitude and to the signals corresponding to the cosines and sines of angle $\phi$ for generating the products of the magnitude times the cosines corresponding to the corrected signal I' and the products of the magnitude times the sines corresponding to the corrected signal Q'.

3. The auto-tint control circuit set forth in claim 2 wherein the means for generating signals corresponding to the sines and cosines of angle $\phi$ comprises a memory element having an address input port coupled to receive the signals corresponding to the angle $\theta$ and programmed to produce at an output port thereof the sines and cosines of the angles applied as address signals, and programmed to produce the sines and cosines of color corrected angles when the address angles $\theta$ fall with said prescribed range.

4. The auto-tint circuit set forth in claim 2 further including means responsive to the signals $\theta$ for applying a static adjustment to the angle $\theta$ under user control, to produce an adjusted angle $\theta'$ corresponding to a static tint adjustment, and which adjusted angles are applied to the means for generating sines and cosines.

5. The auto-tint circuit set forth in claim 2 further including means responsive to the signal corresponding to the magnitude of said vector sum and a gain control signal for linearly adjusting the value of said magnitude, said adjusted magnitude signal being applied to the means for generating the products of the magnitude times the sines and cosines.

6. The auto-tint circuit set forth in claim 2 wherein the angle $\phi$ in said prescribed range is given $\phi = \theta - K \sin 2\theta$ where K is a predetermined constant.

7. A method of performing hue control in a TV receiver having a source of quadrature related color mixture signals by generating adjusted quadrature related color mixture signals comprising:

determining the angle of the vector sum of the color mixture signals relative to the axis of one of said color mixture signals;

determining the magnitude of said vector sum;

applying the angles as address codes to a memory element programmed to output the sines and cosines of the address codes and programmed to output the sines and cosines of corrected angles responsive to address codes occurring in a prescribed range; and multiplying said magnitude by the sines produced by said memory element to generate a first corrected color mixture signal and multiplying the magnitude by the cosines produced by said memory element to generate a second corrected color mixture signal.

8. A color TV receiver including a source of first and second color mixture signals, a first ROM responsive to ratios of said signals for producing signals corresponding to the angle of the vector sum of said signals relative to a reference, and including a second ROM coupled to said first ROM and programmed for producing signals corresponding to trigonometric ratios of angle signals applied thereto, wherein one of said first and second ROM's is programmed non-linearly over a predetermined range of angles processed therein to effect autoflesh correction.

9. A system for processing first and second vector components of a signal including a source of said first and second components, a first ROM responsive to ratios of said first and second components for producing signals corresponding to the angle of said signal relative to a reference, and including a second ROM coupled to said first ROM and programmed for producing signals corresponding to trigonometric ratios of angle signals applied thereto, and wherein one of said first and second ROM's is non-linearly programmed to effect a non-linear rotation of said vector sum over a predetermined range of angles.

10. A system for processing first and second quadrature related components of a signal comprising:

a source of said first and second components;

first means coupled to said source for generating signals representing the ratios of said first and second components;

second means including a ROM having an address input port coupled for applying said signals representing the ratios of said first and second components and programmed for generating trigonometric functions of arguments corresponding to signals applied to the address input port over a first range of said ratios and programmed for generating trigonometric functions of arguments nonlinearly related to signals applied to the address input port over a second range of said ratios; and third means coupled to said source and said second means for producing third and fourth quadrature related signal components linearly related to said first and second components over said first range, and nonlinearly related to said first and second components over said second range.

* * * * *